Oct. 12, 1948. W. MOLLER 2,450,979
BICYCLE AND LIKE VEHICLES
Filed July 11, 1946
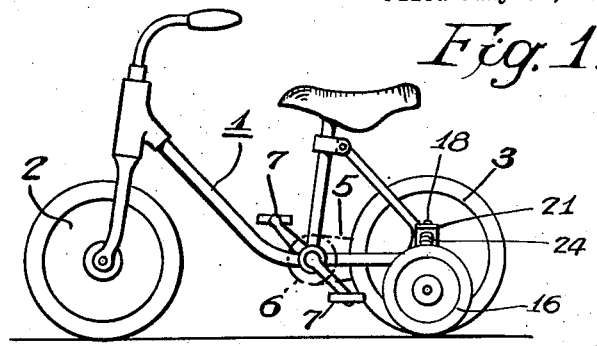
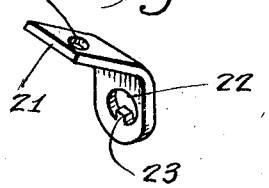
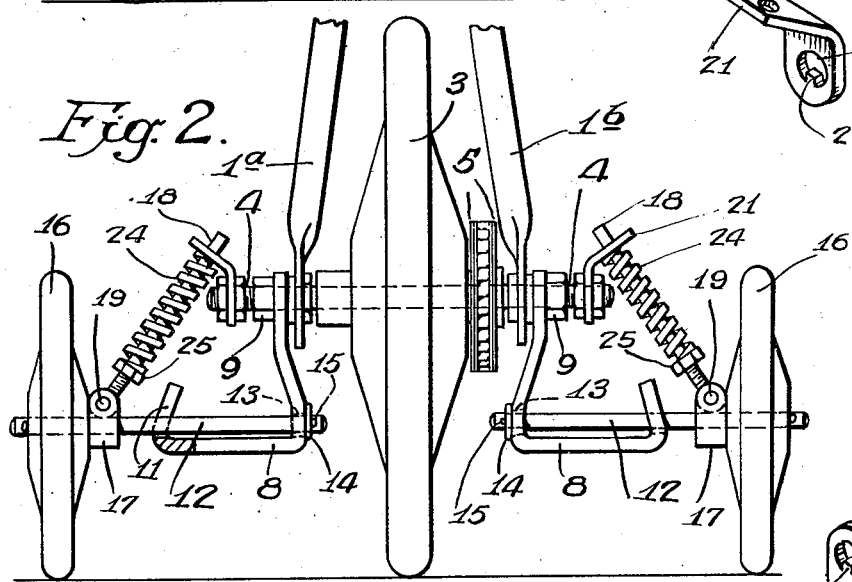
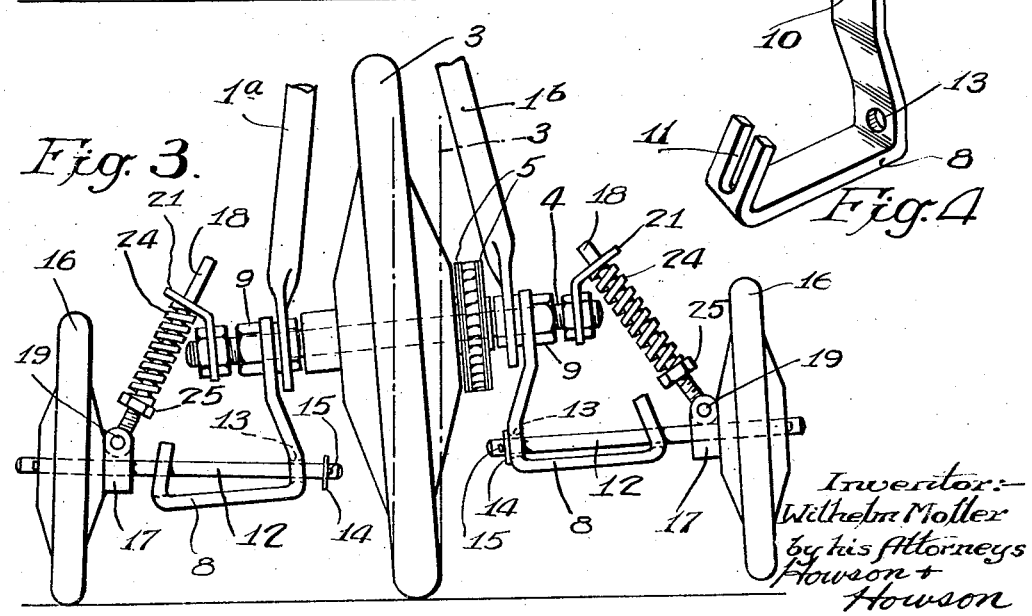
Inventor:-
Wilhelm Moller
by his Attorneys
Howson & Howson Patented Oct. 12, 1948

2,450,979

UNITED STATES PATENT OFFICE 2,450,979

BICYCLE AND LIKE VEHICLES

Wilhelm Moller, Kirklyn, Pa.

Application July 11, 1946, Serial No. 682,869

11 Claims. (Cl. 280—293)

This invention relates to new and useful improvements in bicycles and more particularly to devices for attachment to bicycles and the like to afford lateral stability thereto.

One object of the invention is to provide a novel device for attachment to a bicycle which is operable to provide lateral support and stability to the bicycle to aid beginners learning to ride vehicles of that type.

Another object of the invention is to provide an attachment of the character set forth for bicycles which is constructed and arranged to permit the vehicle to conform to the natural tendency of the rider to lean or bank inwardly when making a turn thereon.

A further object of the invention is to provide a device having the features and characteristics set forth which is of relatively simplified and inexpensive construction and which may be readily and easily installed upon a bicycle or similar type of vehicle.

These and other objects of the invention and the various features and details of the construction and operation thereof are hereinafter fully set forth and described with reference to the accompanying drawing, in which:

Fig. 1 is an elevational view of a bicycle embodying the device of the present invention.

Fig. 2 is an enlarged fragmentary rear elevational view of the bicycle shown in Fig. 1.

Fig. 3 is a view similar to Fig. 2 illustrating the operation of the device; and Figs. 4 and 5 are views in perspective of certain of the parts of the device.

Referring now more particularly to the drawing, the present invention is shown in conjunction with a conventional type two-wheel bicycle having the usual frame 1, front wheel 2 and rear wheel 3, the latter being rotatably supported upon a fixed shaft or rear axle 4 which is secured in the extremities of the frame portions 1a and 1b, respectively. Associated with the rear wheel 3 is the usual sprocket which is rotationally driven by a chain 5 from a sprocket 6 actuated by the rider by means of pedals or the like 7.

In accordance with the present invention, depending brackets 8 are secured by means of nuts or the like 9 upon the extremities of the rear axle 4 of the bicycle at respectively opposite sides of the wheel 3 and outwardly of the frame portions 1a and 1b. The brackets 8 are of generally L-shape as shown in Fig. 4 of the drawing, and are secured against relative rotation with respect to the rear axle 4 by means of a key or like portion 10 arranged to engage similarly configurated slots or key-ways (not shown) formed longitudinally in the opposite end portions of the axle 4.

As more clearly shown in Fig. 4 of the drawing, the outer end portions of the brackets 8 incline inwardly and preferably are bifurcated to provide vertical slots 11 which receive spindles 12. The spindles 12 are longitudinally slidable relative to the brackets 8 and the inner ends of the spindles pass through apertures 13 in said brackets and are secured against outward displacement, for example, by a washer 14 and pin 15. It is to be noted that the apertures 13 are configurated and arranged so that the spindles 12 may pivot or swing vertically relative to the brackets 8 about the points where said spindles pass through the apertures 13 in said brackets.

Supplementary wheels 16 are rotatably mounted upon the outer end portions of the spindles 12 and these wheels are adapted to rest upon the ground or surface in laterally spaced relation at opposite ends of the cycle rear wheel 3 in the relation shown in Fig. 2 of the drawings.

Secured upon the spindles 12 inwardly adjacent the wheels 16 are collars 17 to which rods or the like 18 are pivotally connected, as indicated at 19. The rods 18 extend upwardly and inwardly from the wheels 16 and have their inner ends extending through apertures 20 in arms 21 which are secured upon the extremities of the rear axle 4 outwardly of the brackets 8 thereon. As in the case of the brackets 8, the arms 21 may be restrained against rotation upon the rear axle 4 by providing in the axle openings 22 thereof suitable keys or the like 23 for engagement with the previously mentioned groove or key-way (not shown) provided in the axle 4. Associated with each of the rods 18 is a coil spring 24 which acts between suitable nuts 25 thereon and the arms 21 in a manner to exert resilient pressure tending to hold the wheels 16 and their spindles 12 in the normal position, for example, as shown in Fig. 2 of the drawing. The nuts 25 may be adjusted to vary the pressure of the springs 24 as required or desired.

In operation of the device, when a rider on the bicycle makes a turn the natural tendency to lean or bank inwardly is permitted by action of the spring 24 at the inner side of the bicycle with respect to the turn being made. This action is clearly shown in Fig. 3 of the drawing, and it will be apparent that as the spindle 12 is free to move longitudinally in a direction inwardly of the bracket 8 through the slot 11 and aperture 13 thereof, the relative tilting action illustrated can be accomplished without sliding either the rear axle wheel 3 or the supplementary wheel 16 on the roadway or other supporting surface so that undue wear upon the tires on the wheels is prevented.

From the foregoing it will be apparent that the present invention provides a novel device or attachment for bicycles and like vehicles which provides lateral support and stability to the bicycle to aid beginners learning to balance and ride vehicles of that type. The invention also provides a device of the stated character which is constructed and arranged to permit the bicycle and rider to follow the natural tendency to lean or bank inwardly when making a turn. In addition, the invention provides a device having the features and characteristics set forth which is of relatively simplified and inexpensive construction and which may be readily and easily installed upon a bicycle or similar type of vehicle.

While a particular embodiment of the present invention has been illustrated and described herein it is not intended to limit the invention to such disclosure, and changes and modifications may be made therein and thereto within the scope of the claims.

I claim:

1. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, supplementary wheels on the outer extremities of said spindles, and spring means acting between said axle and said spindles tending to oppose sliding and swinging movements of the latter.

2. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, supplementary wheels on the outer extremities of said spindles, spring means acting between said axle and said spindles tending to oppose sliding and swinging movements of the latter, and means to adjust the force of said springs.

3. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, said brackets limiting swinging movement of said spindles in one direction and having bifurcated outer portions receiving said spindles to guide the same during longitudinal sliding and vertical swinging movements thereof, supplementary wheels on the outer extremities of said spindles, and spring means acting between said axle and said spindles tending to oppose sliding and swinging movements of the latter.

4. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, said brackets limiting swinging movement of said spindles in one direction and having bifurcated outer portions receiving said spindles to guide the same during longitudinal sliding and vertical swinging movements thereof, supplementary wheels on the outer extremities of said spindles, spring means acting between said axle and said spindles tending to oppose sliding and swinging movements of the latter, and means to adjust the force of said springs.

5. In a stabilizing device for bicycles and like vehicles, a pair of brackets to be secured on an axle of the vehicle at respectively opposite sides of a wheel thereon, spindles supported thereby for vertical swinging movement, supplementary wheels on the outer extremities of said spindles, rods pivotally connected to said spindles, an arm fixed on the extremities of said axle and slidably receiving the ends of said rods, and spring means associated with said rods and acting between the spindles and said arms tending to oppose swinging movements of said spindles.

6. In a stabilizing device for bicycles and like vehicles, a pair of brackets to be secured on an axle of the vehicle at respectively opposite sides of a wheel thereon, spindles on said brackets and supported thereby for vertical swinging movement, supplementary wheels on the outer extremities of said spindles, rods pivotally connected to said spindles, arms fixed on the extremities of said axle and slidably receiving the ends of said rods, spring means associated with said rods and acting between said spindles and said arms tending to oppose swinging movements of said spindles, and means to adjust the force of said springs.

7. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, supplementary wheels on the outer extremities of said spindles, collars on said spindles inwardly adjacent said supplementary wheels, rods pivotally connected to said collars and inclined inwardly therefrom, arms fixed on the extremities of said axle of the vehicle slidably receiving the ends of said rods, and spring means associated with said rods and acting between said spindles and said arms tending to oppose both sliding and swinging movements of said spindles.

8. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, supplementary wheels on the outer extremities of said spindles, collars on said spindles inwardly adjacent said supplementary wheels, rods pivotally connected to said collars and inclined inwardly therefrom, arms fixed on the extremities of said axle of the vehicle slidably receiving the ends of said rods, spring means associated with said rods and acting between said spindles and said arms tending to oppose both sliding and swinging movements of said spindles, and means to adjust the force of said springs.

9. In a stabilizing device for bicycles and like vehicles, a pair of brackets to be secured on an axle of the vehicle at respectively opposite sides of a wheel thereon, spindles longitudinally slidable on said brackets and pivotally supported thereby at their inner ends for vertical swinging movement, said brackets limiting swinging movement of said spindles in one direction and having bifurcated outer portions receiving said spindles to guide the same during longitudinal sliding and vertical swinging movements thereof, supplementary wheels on the outer extremities of said spindles, collars on said spindles inwardly adjacent said supplementary wheels, rods pivotally connected to said collars and inclined inwardly therefrom, arms fixed on the extremities of said axle of the vehicle slidably receiving the ends of said rods, spring means associated with said rods and acting between said spindles and said arms tending to oppose both sliding and swinging movements of said spindles, and means to adjust the force of said springs.

10. In a stabilizing device for bicycles and like vehicles, a pair of brackets to be secured on an axle of the vehicle at respectively opposite sides of a wheel thereon, spindles on said brackets pivotally supported thereby at their inner ends for vertical swinging movement, said brackets limiting swinging movement of said spindles in one direction and having bifurcated outer portions receiving said spindles to guide the same during vertical swinging movement thereof, supplementary wheels on the outer extremities of said spindles, and spring means acting between said axle and said spindles tending to oppose swinging movement of the latter.

11. In a stabilizing device for bicycles and like vehicles, a pair of brackets to be secured on an axle of the vehicle at respectively opposite sides of a wheel thereon, spindles on said brackets pivotally supported thereby at their inner ends for vertical swinging movement, supplementary wheels on the outer extremities of said spindles, collars on said spindles inwardly adjacent said supplementary wheels, rods pivotally connected to said collars and inclined inwardly therefrom, arms fixed on the extremities of said axle of the vehicle slidably receiving the ends of said rods, and spring means associated with said rods and acting between said spindles and said arms tending to oppose swinging movement of said spindles.

WILHELM MOLLER.

REFERENCES CITED

The following references are of record in the file of this patent:

FOREIGN PATENTS

| Number | Country | Date |
|---|---|---|
| 11,654 | Great Britain | June 27, 1900 |
| 265,490 | Great Britain | Feb. 10, 1927 |